Feb. 19, 1946. H. L. LAMBERT 2,395,052
ELECTRIC SWITCH
Filed Oct. 13, 1944
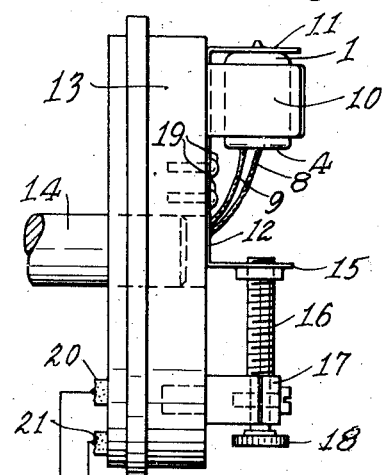
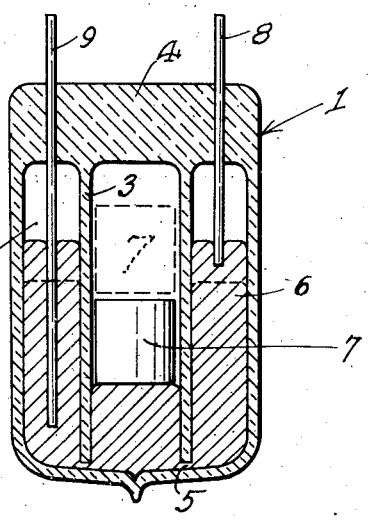
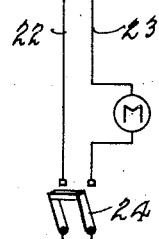
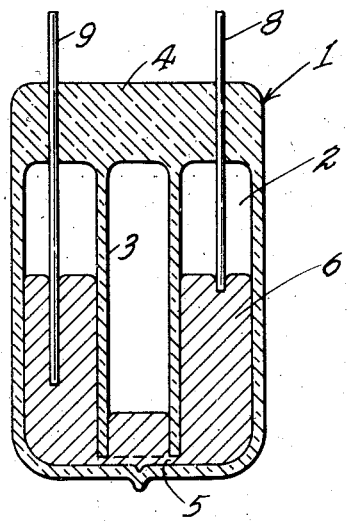
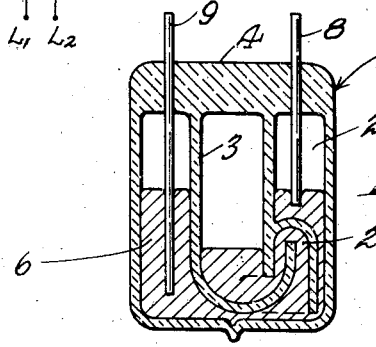
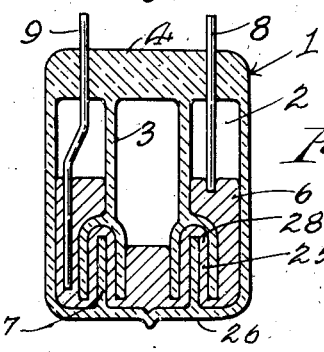
INVENTOR.
Harry L. Lambert
BY
Parker Prochnow & Parmer
Attorneys Patented Feb. 19, 1946

2,395,052

UNITED STATES PATENT OFFICE 2,395,052

ELECTRIC SWITCH

Harry L. Lambert, Enfield, N. Y., assignor to Allen Wales Adding Machine Corporation, Ithaca, N. Y.

Application October 13, 1944, Serial No. 558,544

7 Claims. (Cl. 200—80)

This invention relates to electric switches, and more particularly to those which control an electric circuit in response to variations in centrifugal forces created by rotation of the switch.

An object of the invention is to provide an improved switch which way be mounted on a rotating member, which will open and close a circuit therethrough upon selected changes in the speed of rotation of said member, with which the circuit may be controlled in a simple manner by variations in the liquid level in said switch, with which a circuit may be controlled within close limits in response to centrifugal forces acting on the liquid in said switch when the switch is rotated, which will be especially trouble free, require a minimum of attention, operate for long periods without servicing, be sensitive in its response to fluctuations in speed, and which will be relatively simple, compact and inexpensive.

Other objects and advantages will be apparent from the following description of several embodiments of the invention and the novel features will be pointed out hereinafter in connection with the appended claims.

In the accompanying drawing:

Fig. 1 is a side elevation of a rotating shaft and a switch mounted thereon and constructed in accordance with this invention, with an elementary circuit to be controlled thereby shown diagrammatically;

Fig. 2 is a sectional elevation through a switch constructed in accordance with this invention, and illustrating one embodiment thereof;

Fig. 3 is a similar sectional elevation through the switch, but illustrating another embodiment thereof;

Fig. 4 is a similar, sectional elevation through another switch also constructed in accordance with this invention and illustrating a modification of the embodiment shown in Fig. 3; and Fig. 5 is a sectional elevation similar to Fig. 4 but illustrating a still further modification of the trap which seals the vented end of the tube from the chamber outside of the tube.

Considering the embodiment of the invention illustrated in Figs. 1 and 2, the improved switch includes a housing I which may be made of any suitable material such as glass or plastic, or metal or any other suitable rigid material having therein a sealed chamber 2. A tubular partition or tube 3 extends from a union with one end 4 of the housing across the interior of said chamber toward the other end. This partition 3 extends into close proximity to the opposite end of said chamber 2 but is vented as at 5 to the chamber 2 outside of the partition, either by terminating just short of said opposite end, or by having apertures, or both. This partition 3 is impervious or imperforate between the vent 5 and the end 4 of the housing. A liquid 6 is disposed in and partially fills the chamber 2, and when the switch is held in the position shown in Fig. 2 with the end 4 uppermost, the liquid will seal the vent 5. The partition 3 is preferably circular in transverse cross-section, so as to form a cylindrical tube, and a cylindrical float element 7 which has a density less than that of the liquid, so that it floats therein, is disposed in the tube formed by the partition 3. This element 7 fits the interior of the tube rather closely, yet slides freely along the tube.

The closed end of the tube and the remainder of the chamber 2 contain an inert gas (such as hydrogen when the liquid is mercury) and since the inner end of the tube is closed, the gas in the tube will be trapped therein and the liquid will extend along the outside of the tube from the vented end to a greater distance than within the tube as shown in Fig. 2. When the housing I is inverted, from that shown in Fig. 2 to that shown in Fig. 3, the float element 7 prevents any appreciable quantity of the liquid from passing it and displacing gas from the closed end of the tube. Conductors or electrodes 8 and 9 extend through, and are sealed in the end 4 of the housing, and at their inner ends they extend along the chamber 2 to different distances.

When the housing is idle, the gas pressure in the chamber 2 outside and inside of the tube will tend to balance, and the liquid will normally occupy the levels shown by full lines in Fig. 2, and the float 7 will be in approximately the position shown by full lines. When the level of the liquid is as shown in Fig. 2, which is the level occupied when the device is not rotating, both of the conductors 8 and 9 will extend into the liquid and be electrically connected thereby, it being understood that the liquid is one which conducts electricity. Mercury is particularly useful for this purpose because it is a good conductor of electricity, and it also has substantial density so that when the switch is rotated, the centrifugal forces acting on the liquid will be substantial.

The switch is mounted between spring arms 10 which have oppositely bowed recesses to receive the housing I and the outer end of the housing engages against an end wall 11 provided on the base 12 from which the spring arms 10 extend. This base 12 is mounted on a disc 13 of suitable insulating material which, in turn, is mounted on a shaft 14 which may be rotated by any suitable source of power. The base 12 is disposed radially of the shaft 14 with the wall 11 outermost, so that centrifugal forces acting on the switch can not move the switch endwise between the arms 10 owing to the opposition of this end wall 11. The inner end of the base 12 has an angular arm 15, and a screw 16, which is rotatably mounted in a bearing 17 on disc 13, is threaded through an aperture in the arm 15, so that when the screw 16 is rotated by means of a milled head 18 thereon, the base 12 may be shifted in a radial direction to place the housing 1 at different selected distances from the axis of rotation of the shaft 14.

The base 12 is mounted on disc 13 to slide radially of shaft 14 in any suitable manner such as by having a slot extending lengthwise thereof, and headed pins or screws 19 passing through the slot into the disc 13, with the heads of the pins or screws 19 overlying the face of the base 12 to confine the base 12 to the disc 13, yet permitting movement of the base 12 radially of the shaft 14. The conductors 8 and 9 are connected by flexible extensions to collecting rings carried on the opposite face of the disc 13, and brushes 20 and 21 which bear on these collecting rings, provide for a completion of the circuit from conductors 8 and 9 to circuit wires 22 and 23 while disc 13 and the switch rotate with shaft 14. One of these wires, such as 23, may have in series therein a part M. A circuit from line wires L¹ and L² controlled by a switch 24, supplies current to the wires 22 and 23.

With such an arrangement, when the shaft 14 rotates, the liquid 6 will be confined in the end of the housing 1 around the vent 5, as shown in full lines in Fig. 2, and a circuit will be established between wires 22 and 23 through the conducting liquid. When the housing 1 is rotated in this manner, the centrifugal forces created by the rotation will act on the conducting liquid 6, urge it all into the outer end of the chamber 2 around the vent 5, and try to equalize the levels inside and outside of the tube. This will shift the float element 7 from the position shown in full lines, towards the position shown in dash lines in the tube as the speed of rotation increases, and when the speed has reached a selected speed, the liquid level in the chamber 2 outside of the tube will be depressed to that shown by dash lines in Fig. 2 at which time the liquid will be out of contact with the conductor.

This opens the circuit between wires 22 and 23, and the circuit will remain open until the speed of shaft 14 falls sufficiently, whereupon the gas, which is trapped in the closed end of the tube 3 and compressed by the centrifugal forces trying to equalize the levels of liquid in the housing, will overcome the decreasing centrifugal forces, and in expanding, will push the float 7 radially in an outward direction and displace liquid toward the conductor 8 until a circuit is re-established between conductors 8 and 9 by the liquid 6. The presence of the inert gas in the tube allows the liquid levels inside and outside of the tube to vary with varying centrifugal forces, and thus the switch is directly responsive in its circuit opening and closing functions to the speed of rotation. By shifting the housing bodily away from or toward the axis of rotation of the shaft 14, the value of the centrifugal forces acting on the liquid at any speed may be varied. The greater the distance of the switch from the axis of rotation, the greater will be the centrifugal forces for a given speed, and thus by turning the screw 16, one may shift the position of the switch housing 1, and thus vary the speeds at which the circuit will be opened and closed between conductors 8 and 9.

The part marked M, which is in series with the circuit wire 23, may be a signal device or a motor, but, if it is the motor which drives the shaft 14, the switch will then function to govern the speed of the motor, because when the speed reaches that determined by the adjustment of the screw 16, the circuit through the operating motor will be opened. The operating motor will then decrease in speed, and with such decrease, the centrifugal forces will decrease and a circuit through the motor will be re-established. Thus the speed of the motor may be maintained within close limits. If the part M is a signal or other instrument, its controlling circuit will be rendered ineffective when the circuit is opened in the housing 1, and thus will indicate whether the speed is above or below a particular speed for which the device has been set through operation of screw 16.

The modification shown in Fig. 3 is similar to Fig. 2, except that no float element 7 is employed. With this form of the invention, the switch should always be stopped with the end 4 uppermost, because otherwise, the gas trapped in the closed end of the tube 3 might escape past the liquid seal at the vented end 5, and if the tube became entirely filled with liquid, the device would not respond in the manner explained in connection with Figs. 1 and 2. By using the float 7 shown in Fig. 2, the danger of the liquid displacing gas from the inside of the tube is avoided, and one need not be particular about the position in which the switch stops.

In Fig. 4 a double liquid trap is provided at the vented end of the tube 3, to keep the vent sealed by the liquid in all positions of the housing 1, and thus prevent the escape of gas trapped in the closed end of the tube 3 if the switch happens to stop in a position inverted from that shown in Fig. 4. It will be observed that if the switch shown in Fig. 4 is inverted, some of the liquid in the tube 3 may fall to the closed end of the tube, but there will always be sufficient liquid in the trap 25 to prevent the escape of gas from the tube 3, and when the tube is again returned into the position shown in Fig. 4, the liquid which went to the closed end of tube 3 will return to the position shown in Fig. 4 where it merges with the liquid in the trap 25. This trap 25 is merely a U-shaped channel or passage connecting the interior of the tube 3, at its outer end, with the chamber 2, with the base of the U nearest end 4 of the housing. Such U shaped traps are widely used in plumbing and liquid handling apparatus to prevent the escape of gas from a chamber. Functionally, the device shown in Fig. 4 will operate the same as explained in connection with Fig. 3.

In Fig. 5, a slightly different form of trap 25 is illustrated in which the end 26 of the housing 1 carries a circular partition 27 which extends into a U-shaped annular channel 28 provided in the outer end of the tube 3. Liquid in passing from the inside of the tube 3 outwardly to the chamber 3, must pass through the U-shaped channel 28, and this passage remains sealed when the switch, shown in Fig. 5, is inverted from that position, in the same way that the trap 25 acted to prevent escape of the gas from the closed end of tube 3 in the switch shown in Fig. 4. The switch shown in Fig. 5 functions in the same manner as Figs. 3 and 4.

While the varying liquid level in chamber 2 may be used to operate a switch through a float, in which case the liquid 6 need not be a conductor of electricity, it is much simpler to use a conducting liquid to connect electrodes or contacts 8 and 9. The contacts 8 and 9 may extend to different distances or for the same distance into chamber 2, but contact 8 should be the one from which the liquid separates to open the circuit.

It will be understood that various changes in the details, materials and arrangements of parts, which have been herein described and illustrated in order to explain the nature of the invention, may be made by those skilled in the art within the principle and scope of the invention, as expressed in the appended claims.

I claim:

1. A switch comprising a housing having a sealed chamber containing an inert gas, a tubular, imperforate partition extending from one end of the chamber towards and into close proximity to the other end, and vented to the chamber on the outside of said partition at said other end, a liquid within and only partially filling said chamber and when confined in said other end sealing said vented end of said partition, the compartment enclosed by said partition being partially filled with said gas, and said liquid normally extending further along the outside of said partition towards said one end than along the inside, whereby when said housing is rotated about an axis transverse to the length of said chamber and nearer said one end than said other end, the centrifugal forces acting on said liquid will confine the liquid in said other end around the vented end of said partition and tend to equalize the liquid levels outside and inside of said partition to increasing extents with increases in the centrifugal forces, and conducting means in said chamber connected and disconnected by the varying levels of said liquid in said chamber.

2. A switch comprising a housing having a sealed chamber containing an inert gas, a tubular imperforate partition extending from one end of the chamber towards, and into close proximity to the other end, and vented to the chamber on the outside of said partition at said other end, an electricity conducting liquid within and only partially filling said chamber and when confined in said other end sealing said vented end of said partition, the compartment enclosed by said partition being partially filled with said gas, and said liquid normally extending further along the outside of said partition towards said one end than along the inside, whereby when said housing is rotated about an axis transverse to the length of said chamber and nearer said one end than said other end, the centrifugal forces acting on said liquid will confine the liquid in said other end around the vented end of said partition and tend to equalize the liquid levels outside and inside of said partition to increasing extents with increases in the centrifugal forces, and conductors extending into said chamber from the exterior of said housing, on the outside of said partition, and having exposed contact portions within the chamber connected and disconnected by engagement and disengagement therewith by said conducting liquid as a liquid varies its level in said chamber in response to varying centrifugal forces.

3. The switch substantially as set forth in claim 1 in which the vent connection between the vented end of said partition and the chamber outside of said partition includes a double liquid trap for retaining a sealing liquid around the vented end of said partition, as the housing changes its position.

4. The switch substantially as set forth in claim 1, and a float element closely fitting and freely slidable along the inside of said partition to prevent the displacement of the gas at said one end of the partition when the vented end is held uppermost.

5. A switch comprising a housing having a sealed chamber containing an inert gas, a tube having an imperforate wall extending from one end of the chamber towards the other end, and vented to said chamber outside of the tube solely at said other end, a liquid within and only partially filling said chamber, and when confined in said other end being sufficient in amount to seal said vented end of said tube, said tube having a substantial quantity of said gas trapped therein by said seal, and the liquid extending along the outside of said tube toward said one end to a greater extent than within the tube, whereby when said housing is rotated about an axis transverse to the length of said tube and nearer said one end than said other end, the centrifugal forces acting on said liquid will confine it in said other end around the vented end of said tube and tend to equalize the liquid level outside and inside of said tube to varying extents with variations in the centrifugal forces, and switch elements within said housing positioned to be connected and disconnected by the varying levels of said liquid in said housing while the housing is being rotated about said axis, said switch elements having conducting portions extending therefrom through the wall of said housing to the exterior thereof for connection in a circuit to be controlled.

6. The switch substantially as set forth in claim 5, and a float element fitting and sliding along the inside of said tube and acting as a plug to prevent displacement of said gas from within said tube by said liquid when the switch is stopped with the vented end of said tube uppermost.

7. A switch substantially as set forth in claim 5, in which the vented end of said tube is formed into a trap which is the sole connection between the interior of said tube and said chamber outside the tube, and which is effective when the housing is held with its vented end upright to trap some of said liquid and seal said vent to prevent escape of gas from said tube.

HARRY L. LAMBERT.